(12) United States Patent
Hosaka et al.

(10) Patent No.: US 6,198,880 B1
(45) Date of Patent: Mar. 6, 2001

(54) LENS-FITTED FILM UNIT HAVING A TOUCH SENSOR

(75) Inventors: Takao Hosaka; Takuro Masuda; Kozue Yogata; Hiroshi Yamaguchi, all of Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/320,301

(22) Filed: May 26, 1999

(30) Foreign Application Priority Data

May 28, 1998 (JP) .................................................. 10-162784
Sep. 4, 1998 (JP) .................................................. 10-267373

(51) Int. Cl.[7] ............................. G03B 15/05; G03B 17/00
(52) U.S. Cl. ................................. 396/6; 396/52; 396/155; 396/263; 396/502
(58) Field of Search ................................. 396/6, 52, 155, 396/159, 164, 263, 301, 302, 502, 543, 53

(56) References Cited

U.S. PATENT DOCUMENTS

| | | | |
|---|---|---|---|
| 4,247,188 | * 1/1981 | Kobori | 396/263 |
| 4,306,792 | * 12/1981 | Prochnow | 396/164 X |
| 5,541,686 | * 7/1996 | Stephenson | 396/164 |
| 5,574,337 | * 11/1996 | Dunsmore | 396/6 X |
| 5,878,283 | * 3/1999 | House et al. | 396/6 |
| 5,923,908 | * 7/1999 | Schrock et al. | 396/263 X |

* cited by examiner

Primary Examiner—Alan A. Mathews
(74) Attorney, Agent, or Firm—Jordan B. Bierman; Bierman, Muserlian and Lucas

(57) ABSTRACT

A lens-fitted film unit which includes a photographing film, pre-loaded in the lens-fitted film unit; a photographing lens; a shutter; an electronic flash emission portion; and an electronic flash circuit, connected with the electronic flash emission portion. That electronic flash emission portion further includes a capacitor for storing electric charges necessary for electronic flash emission; and a start-charge switch for causing the capacitor to start charging. The start-charge switch includes a touch sensor with which the start-charge switch is turned on when a photographer touches the touch sensor.

25 Claims, 13 Drawing Sheets

( APERTURE FOR BRIGHTNESS )

( APERTURE FOR GLOOM )

LENS-FITTED FILM UNIT HAVING A TOUCH SENSOR

BACKGROUND OF THE INVENTION

The present invention relates to a lens-fitted film unit, and more particularly, to a lens-fitted film unit which makes it possible to photograph under an appropriate exposure.

Lens-fitted film units which are relatively inexpensive are available on the market, which makes it possible to enjoy photographing at ease without using an expensive camera. A user purchases a lens-fitted film unit with a built-in film, and carries it into a certain photofinisher after photographing for a prescribed number of exposures.

In the photofinisher, a film is separated from a camera main body of the lens-fitted film unit thus carried in, then, a first cycle print is made from the film in general, and a negative film and a photograph representing the print are returned to the user. On the other hand, the camera main body is collected to a prescribed factory for recycling.

Incidentally, in the case of this lens-fitted film unit under the condition of recycling, it is necessary to keep its cost low, and a camera of this kind is provided with only required and minimum functions. Therefore, even under the photographing conditions which are not problematic for ordinary cameras, troubles are sometimes caused. An example of these troubles is shown below.

For example, since an ordinary lens-fitted film unit is not equipped with a photometry means, even in the case of a lens-fitted film unit with an electronic flash unit, a photographer must decide whether to use the electronic flash unit or not. Accordingly, in a lens-fitted film unit of this type, there is provided a manual operation switch with which an electronic flash unit is caused to emit light. However, this switch is designed to be turned on and turned off by the movement of a sliding member, for example, and once the sliding member is slid to the ON side, an electronic flash circuit continues charging a capacitor unless the sliding member is returned to the OFF side. When a photographer forgets to turn off the electronic flash switch, wasteful charging is continued, resulting in a problem that electronic flash photographing is impossible because of a battery which is dead when it is used for actual photographing. Since it is impossible for a photographer to replace a battery in the case of an ordinary lens-fitted film unit, the problem mentioned above is extremely serious.

Further, since a photographer often does not feel the gloom, due to a characteristic of human eyes, even when luminance of field is lowered to a certain extent, the photographer believes that photographing can be conducted sufficiently even under the state of low luminance like that under a fluorescent lamp for interior illumination, and photographs without using electronic flash emission. In that case, there is caused a problem of the so-called under exposure, and necessary image quality can not be obtained.

SUMMARY OF THE INVENTION

In view of problems in the prior art, an object of the present invention is to provide a lens-fitted film unit capable of photographing under an appropriate exposure.

To attain the object stated above, a lens-fitted film unit of the invention is represented by a lens-fitted film unit having therein a capacitor storing electric charges necessary for electronic flash emission and a start-charge switch which causes, when it is in continuity, the capacitor to start charging, wherein the start-charge switch is equipped with a touch sensor provided on the portion which is touched by a finger of the photographer when the photographer holds the lens-fitted film unit for the ready, and the start-charge switch is turned on when a finger of the photographer touches the touch sensor.

A lens-fitted film unit of the invention is characterized in that an electronic flash unit which emits light constantly responding to shutter release independently of luminance of field, and a control means which controls, in at least two steps, an amount of emission of the electronic flash unit are provided in the lens-fitted film unit.

Since the lens-fitted film unit of the invention is equipped with a touch sensor provided on the portion which is touched by a finger of a photographer when the photographer holds the lens-fitted film unit for the ready, and the start-charge switch is turned on when a finger of the photographer touches the touch sensor, charging for an electronic flash can be started when the photographer just holds the lens-fitted film unit for the ready for releasing the shutter, and thereby the electronic flash unit flashes responding to shutter releasing even when the photographer does not intend to make the electronic flash unit to emit light, which prevents under exposure and offers easy operation.

If the photographer unhands the lens-fitted film unit, charging for an electronic flash is automatically stopped. Therefore, there will be caused no problem that a switch of the electronic flash unit fails to be turned off, and a battery is made to be dead.

Since the lens-fitted film unit of the invention is equipped with an electronic flash unit which is constantly ready to flash in response to shutter releasing regardless of a level of luminance of the field to be photographed, it is possible to prevent under exposure, and it is further possible to prevent over exposure by controlling an amount of emission when luminance of a field to be photographed is high, because of the control means provided which controls an amount of emission of the electronic flash unit at least in two steps.

Another example of the invention is represented by a lens-fitted film unit equipped with an electronic flash unit, wherein there is provided a photographing condition setting means which sets the electronic flash unit to be ready for flashing, and switches plural aperture steps responding to movement of the lens-fitted film unit to the state of photographing.

In this example, when a photographer uses this lens-fitted film unit for photographing, the photographing condition setting means sets the electronic flash unit to be ready for flashing to flash in concert with operation of a shutter release button, and it switches plural aperture steps in accordance with a level of luminance in photographing. Therefore, it is possible to obtain an excellent photograph constantly, independently of a bright scene and a gloomy scene.

Further, another example of the invention is represented by a lens-fitted film unit equipped with an electronic flash unit, wherein there is provided a photographing condition setting means which is composed of a cover body which covers one of at least a viewfinder and a shutter release button of the lens-fitted film unit in non-photographing time, and exposes the viewfinder and shutter release button responding to the sliding operation for movement to the state of photographing, and a preparation mechanism for start of photographing which conducts operations to turn on or turn off the charging of the electronic flash unit responding to the sliding operations for the cover body and conducts operations to switch between an aperture for brightness and an aperture for gloom.

In this example, when there is conducted an operation to slide the cover body toward the position for the aforesaid aperture for brightness and for the turning on of charging of the electronic flash unit or toward the position for the aperture for gloom and for the turning on of charging of the electronic flash unit, in the course of photographing, the preparation mechanism for start of photographing conducts operations to turn on or turn off charging of the electronic flash unit, and operations to switch between the aperture for brightness and aperture for gloom. Therefore, by only operations to slide the cover body, the electronic flash unit is set to be ready for emission to flash with an operation of the shutter release button, and an aperture is set to an aperture for brightness or an aperture for gloom depending on a level of brightness in photographing, Therefore, it is possible to obtain an excellent photograph constantly, independently of a bright scene and a gloomy scene.

Another example of the invention is represented by a lens-fitted film unit equipped with an electronic flash unit, wherein there are provided a vibration detecting means which detects generation of vibration of the lens-fitted film unit itself, an electronic flash circuit which starts charging for a capacitor in the electronic flash unit based on signals of the detection for the existing vibration conducted by the vibration detecting means, and a charging stop circuit which stops charging of a capacitor in the electronic flash circuit after progress of a certain period of time from the start of charging.

In this example, operations of the vibration detecting means make the charging of a capacitor in the electronic flash unit to be started with vibration generated when a photographer holds the lens-fitted film unit itself for the ready, and the charging stop circuit stops the charging of a capacitor in the electronic flash circuit after progress of a certain period of time from the start of charging. Therefore, the electronic flash unit can be set automatically to be ready for emission only by operations to hold, with hands, the lens-fitted film unit itself for the ready.

Another example of the invention is represented by a lens-fitted film unit equipped with an electronic flash unit, wherein there are provided a vibration detecting means which detects generation of vibration of the lens-fitted film unit itself, an electronic flash circuit which starts charging for a capacitor in the electronic flash unit based on signals of the detection for the existing vibration conducted by the vibration detecting means, a charging stop circuit which stops charging of a capacitor in the electronic flash circuit after progress of a certain period of time from the start of charging, a photodetecting means which detects luminance of environmental light for the lens-fitted film unit, and an emission control circuit which conducts emission stop control or emission control of the electronic flash unit in accordance with a level of luminance of environmental light detected by the photodetecting means in the course of releasing operations of the lens-fitted film unit.

In this example, there is no problem that an electronic flash unit flashes when luminance of environmental light is high, or an electronic flash unit does not flash when luminance of environmental light is low, and excellent photographs can be obtained constantly, because the electronic flash unit does not flash or flashes depending on a level of luminance of environmental light.

Each of FIGS. 4(a) and 4(b) is a perspective view of a lens-fitted film unit missing a part thereof in another variation.

Figure 5:
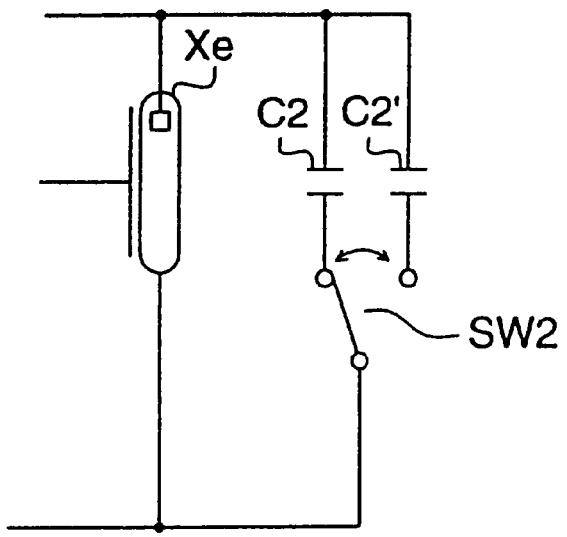

FIG. 5 is a circuit diagram of a lens-fitted film unit missing a part thereof in the second embodiment.

Figure 6:
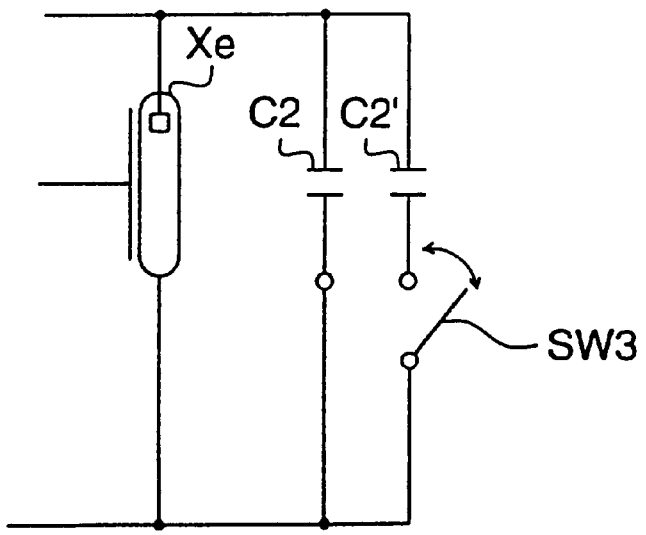

FIG. 6 is a circuit diagram of a lens-fitted film unit missing a part thereof in the third embodiment.

Figure 7:
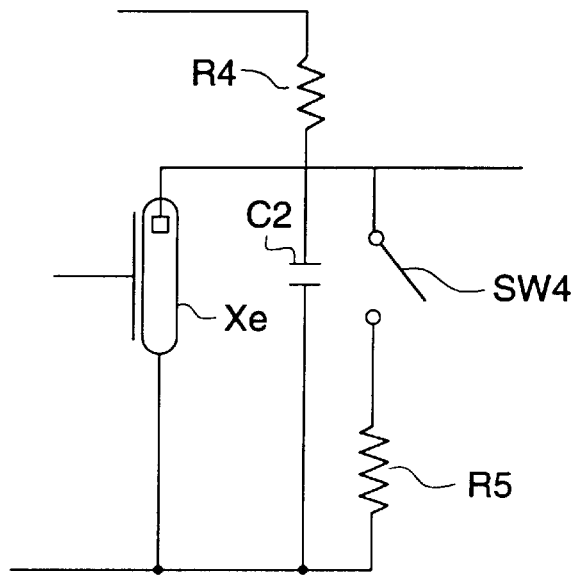

FIG. 7 is a circuit diagram of a lens-fitted film unit missing a part thereof in the fourth embodiment.

Figure 8:
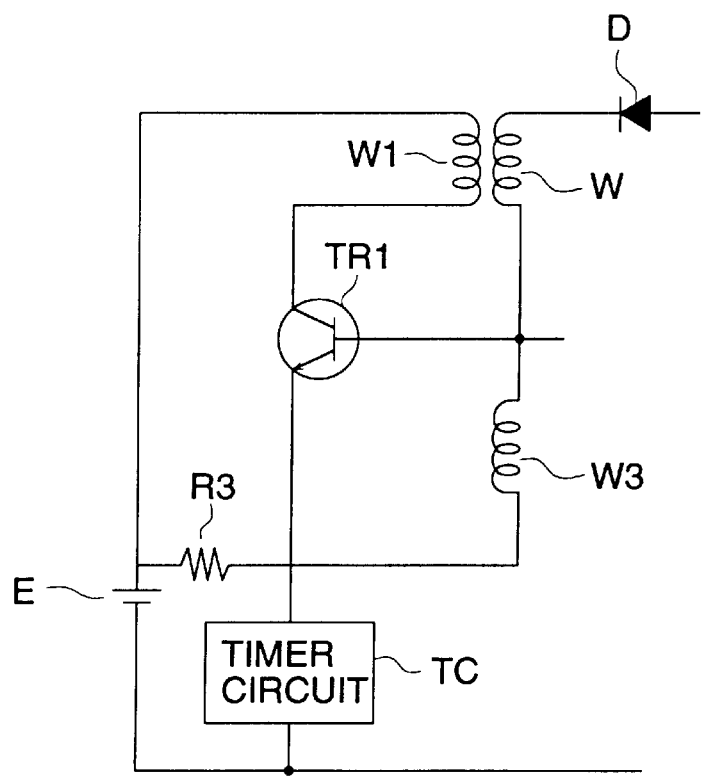

FIG. 8 is a circuit diagram of a lens-fitted film unit missing a part thereof in the fifth embodiment.

Figure 9:
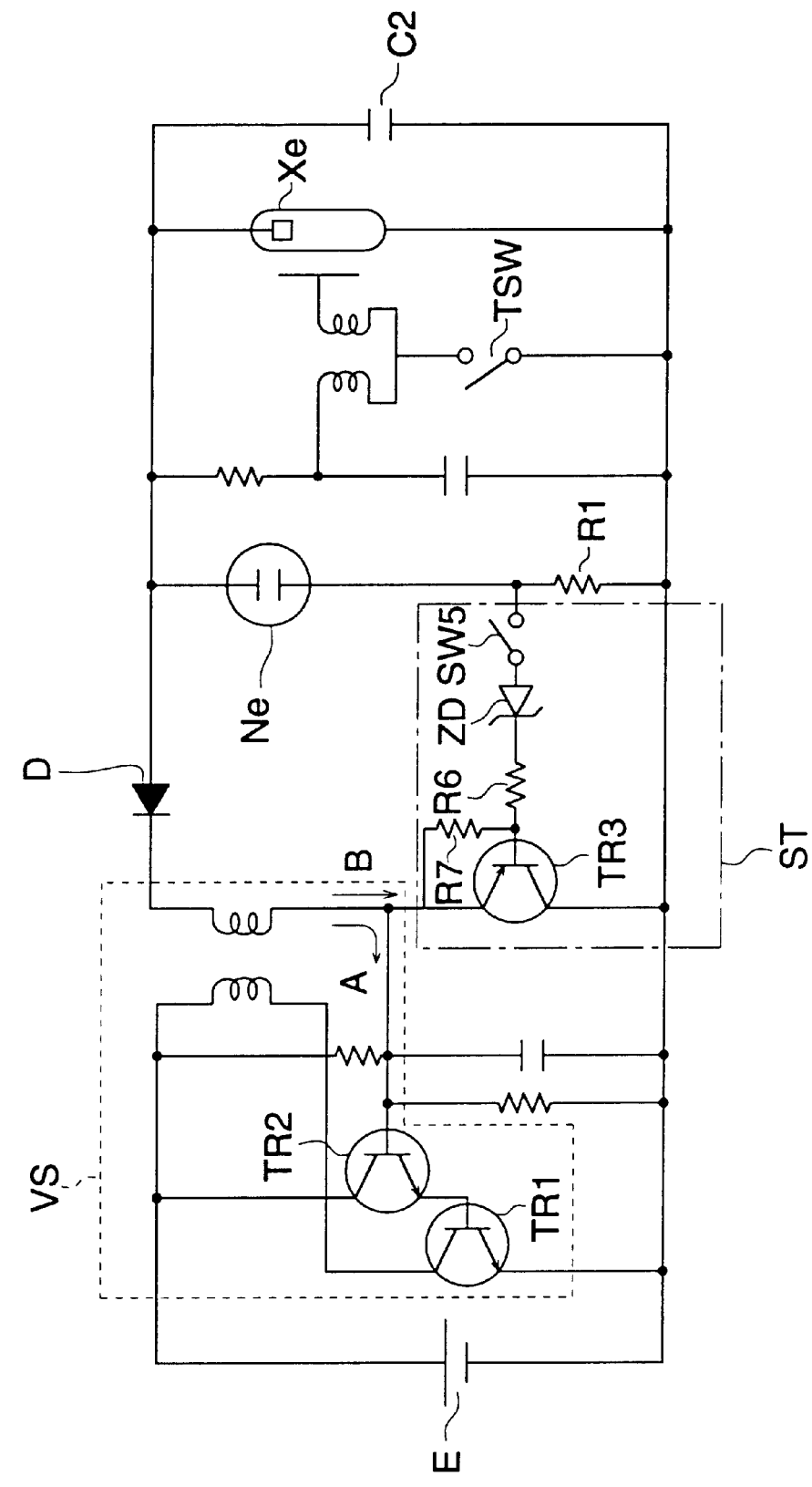

FIG. 9 is a circuit diagram of a lens-fitted film unit missing a part thereof in the sixth embodiment.

Figure 10:
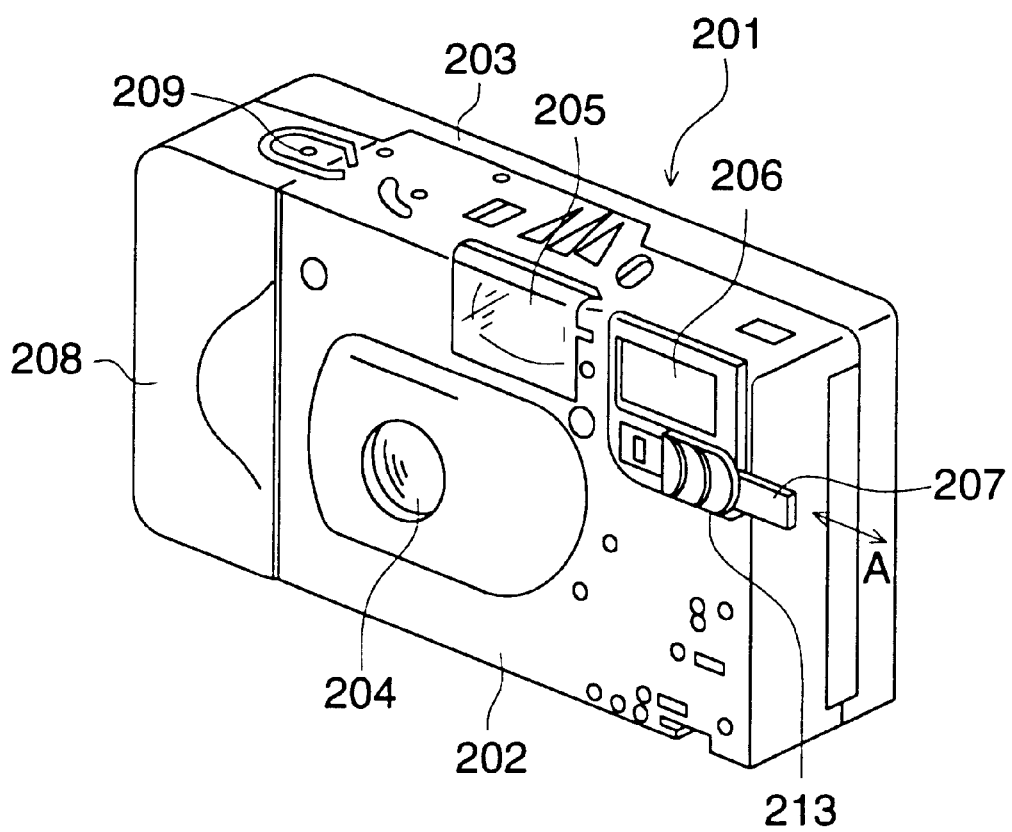

FIG. 10 is a perspective view showing a lens-fitted film unit in the seventh embodiment.

Figure 11:
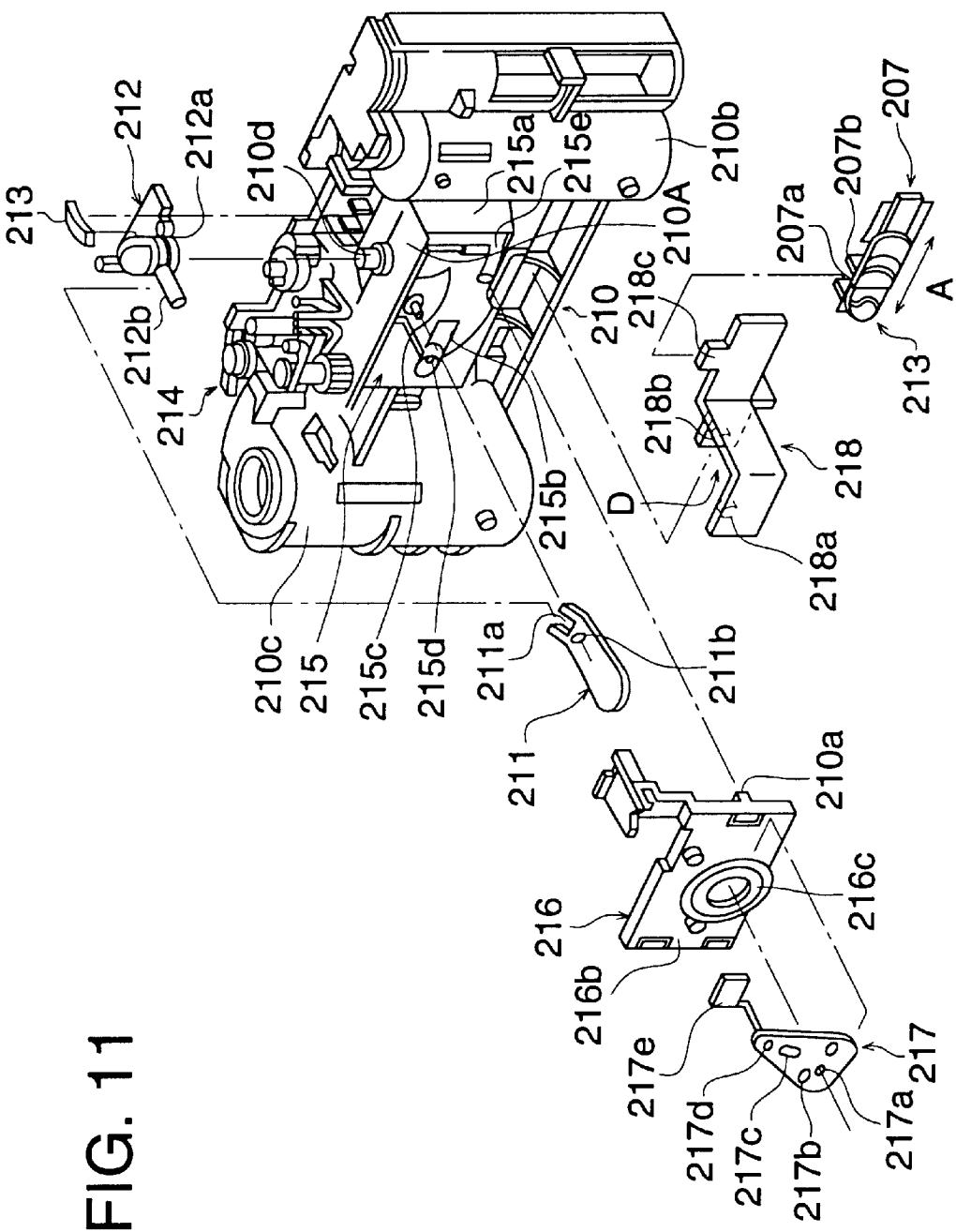

FIG. 11 is an exploded perspective view showing a lens-fitted film unit in the seventh embodiment.

Figure 12:
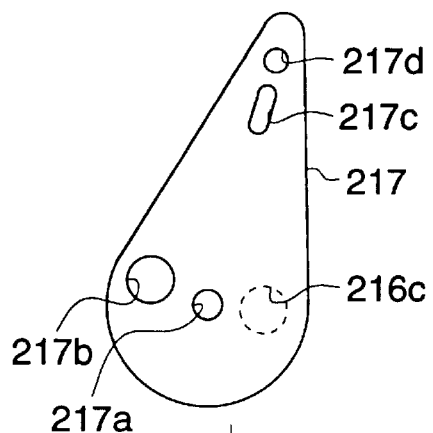
Figure 12:
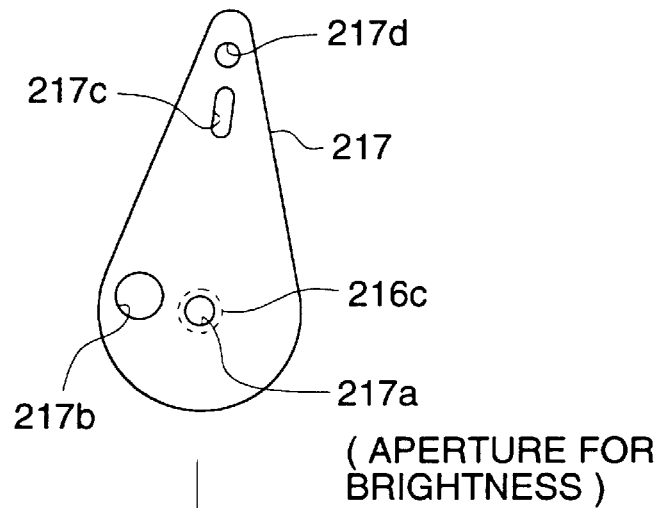
Figure 12:
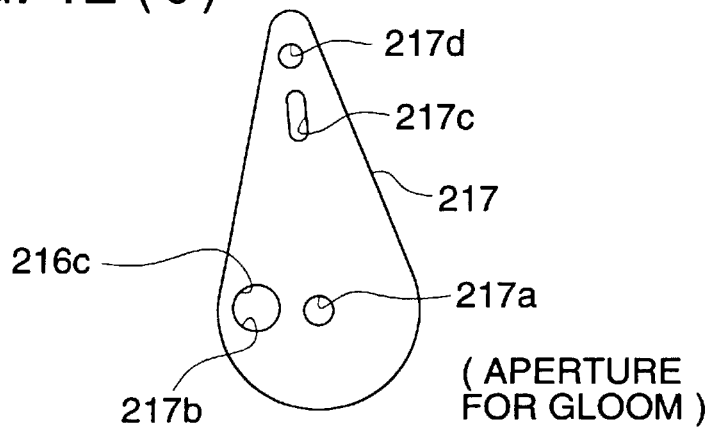

Each of FIGS. 12(a)–12(c) is an illustration showing aperture switching operations by aperture plate in the seventh embodiment.

Figure 13:
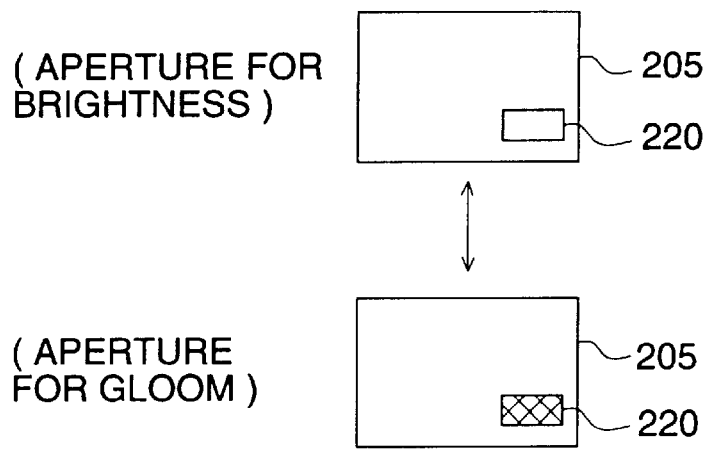

FIG. 13 is an illustration showing color change caused by the change in luminance of environmental light of a light modulating member in the seventh embodiment.

Figure 14:
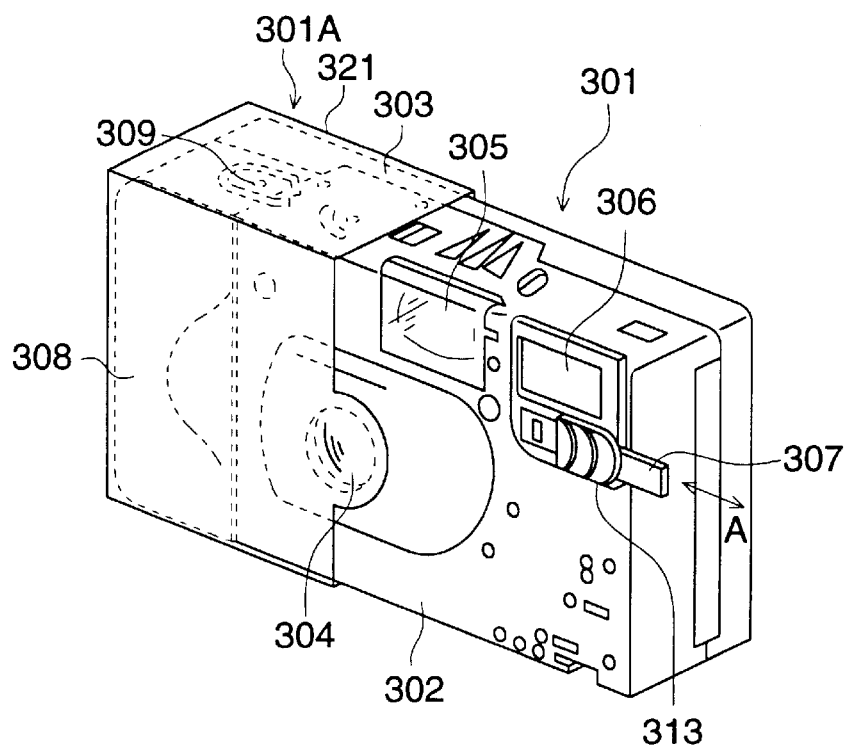

FIG. 14 is a perspective view showing a lens-fitted film unit in the eighth embodiment.

Figure 15:
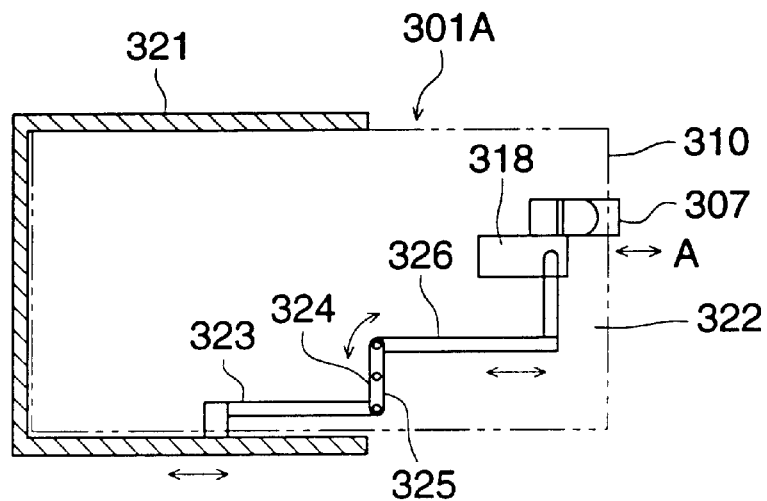

FIG. 15 is a schematic diagram showing the mechanism of a photographing condition setting means in a lens-fitted film unit in the eighth embodiment.

Figure 16:
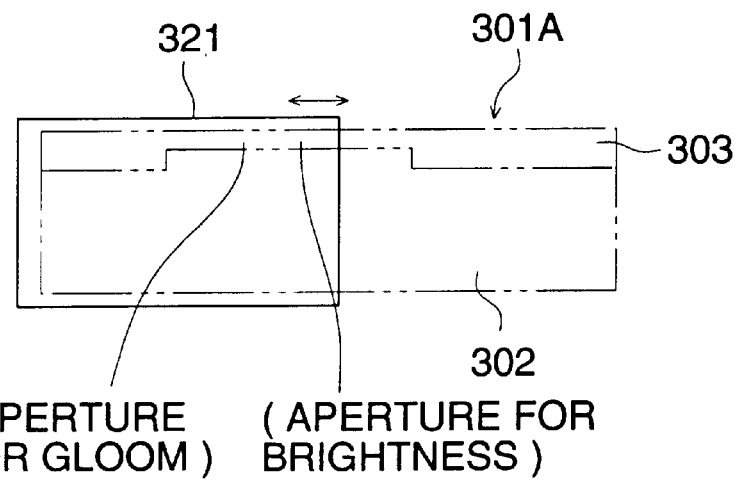

FIG. 16 is a schematic top view of a lens-fitted film unit in the eighth embodiment.

Figure 17:
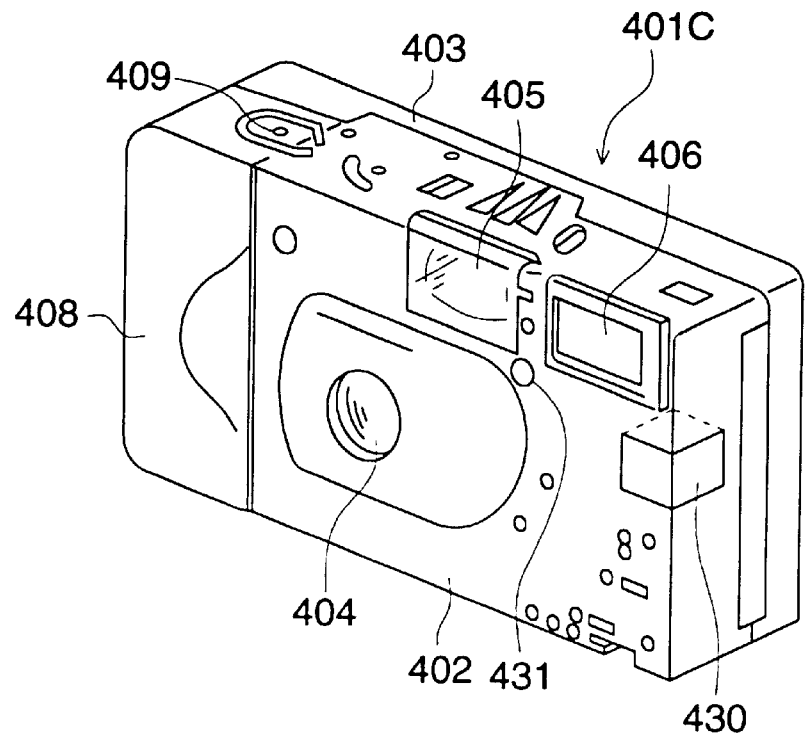

FIG. 17 is a perspective view showing a lens-fitted film unit in the ninth embodiment.

Figure 18:
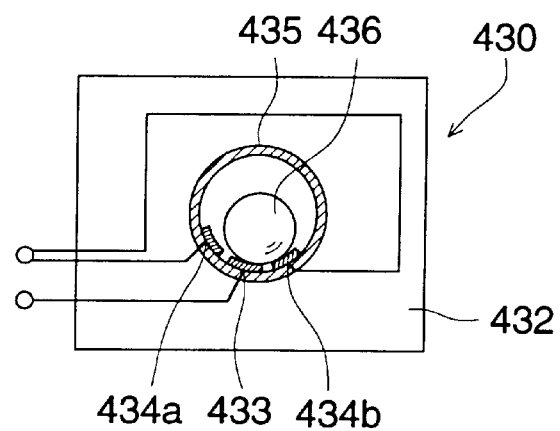

FIG. 18 is a diagram showing a vibration sensor of lens-fitted film unit in the ninth embodiment.

Figure 19:
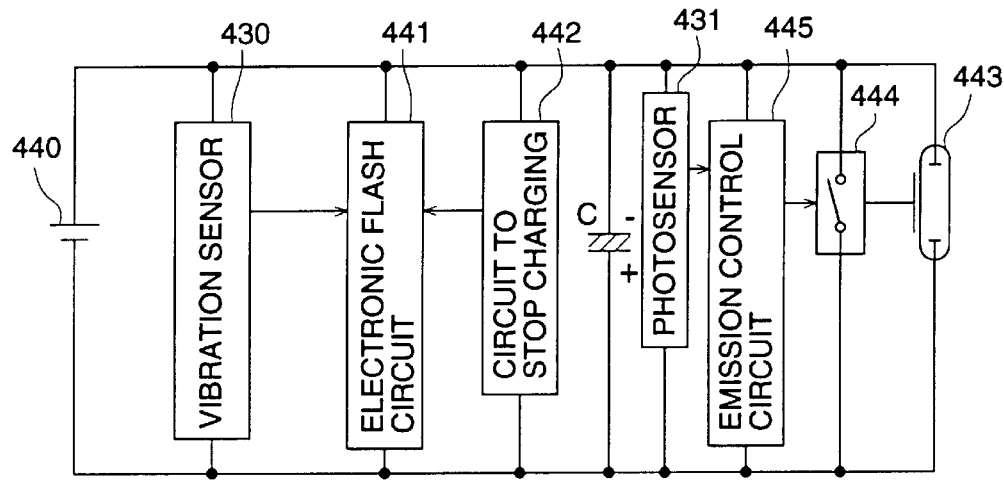

FIG. 19 is a circuit diagram showing a control circuit of an electronic flash unit in the ninth embodiment.

Figure 20:
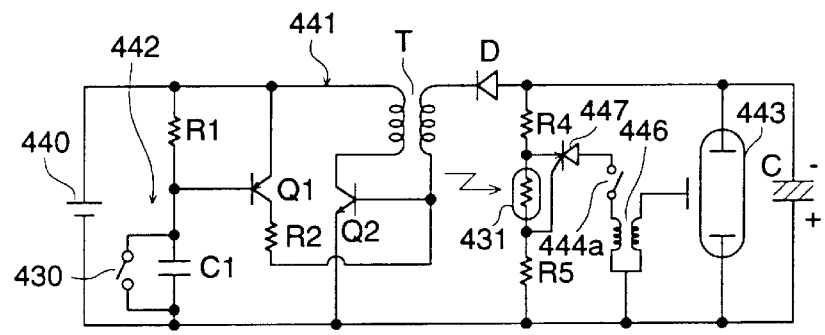

FIG. 20 is a circuit diagram showing the concrete example of a circuit shown in FIG. 19 in the ninth embodiment.

Figure 21:
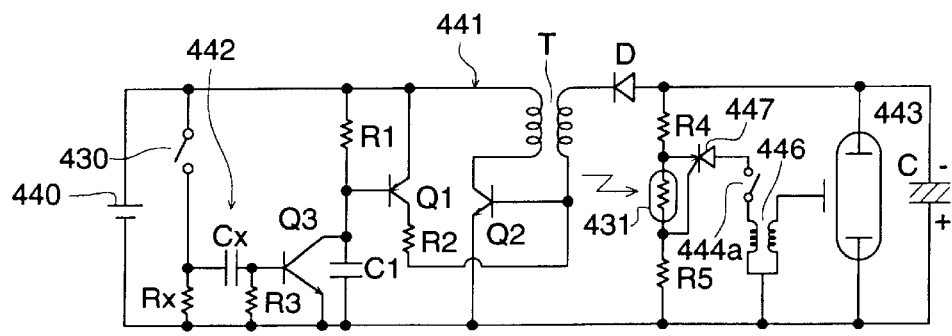

FIG. 21 is a circuit diagram showing the concrete example of a circuit shown in FIG. 19 in the ninth embodiment.

DETAILED DESCRIPTION OF THE INVENTION

An embodiment of the invention will be explained as follows, referring to the drawings. In the present invention, "the start-charge switch starts charging by a holding action of the lens fitted film unit to prepare for photographing" means that the charging operation is initiated by holding or moving action of the lens fitted film unit when a photographer holds the lens-fitted film unit to take photography.

Figure 1:
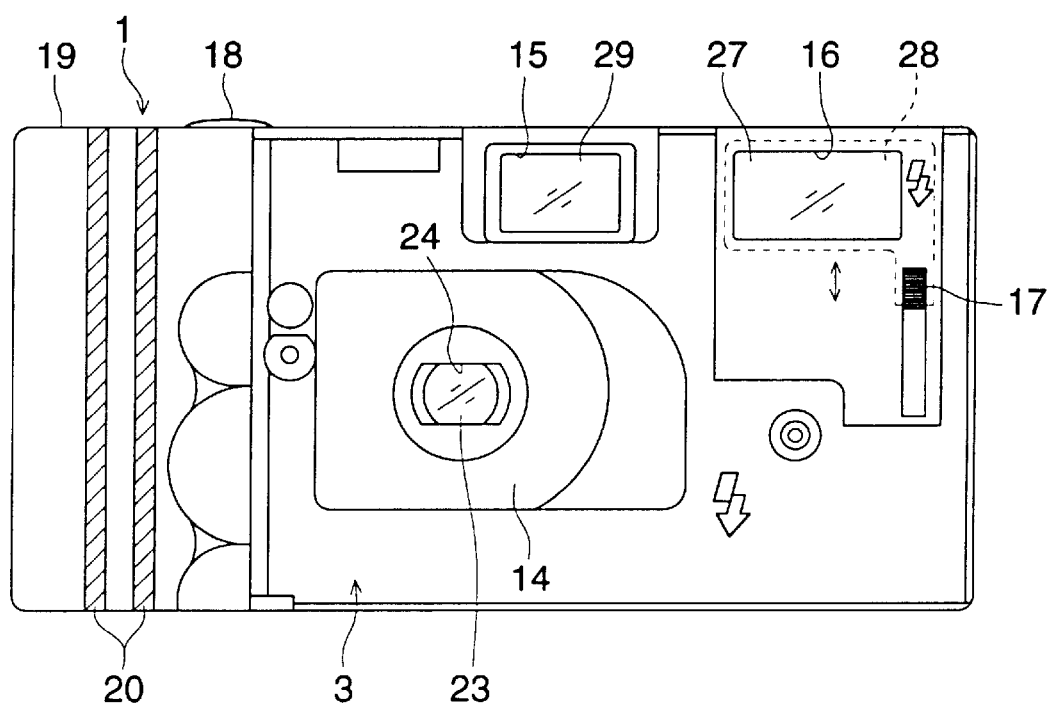
FIG. 1 is a front view of a lens-fitted film unit in the present embodiment.
Figure 3:
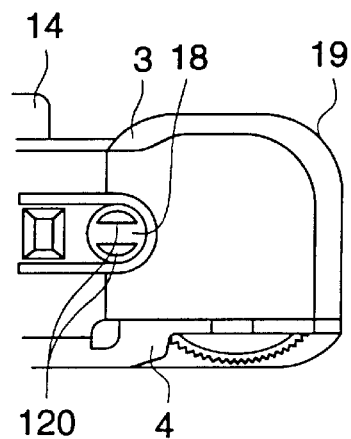
FIG. 3 is a top view of a lens-fitted film unit in a variation of the present embodiment.

FIG. 1 is a front view of a lens-fitted film unit in the present embodiment, wherein lens-fitted film unit 1 is composed of camera main body 2, front cover 3 and rear cover 4 each being formed by resin material (see FIG. 3).

On the central portion of the front cover 3 shown in FIG. 1, there is provided convex 14 which is protruded toward the front of the camera. On the central portion of the convex 14, there is formed opening 24, and camera lens 23 is arranged inside the opening 24. Above the convex 14, there is formed viewfinder window section 15, and viewfinder objective lens 29 is arranged inside the viewfinder window section 15. Shutter release button 18 is provided at the left portion on the top surface of the lens-fitted film unit 1.

Further, there are provided an electronic flash emission section having therein a light-emitting tube, a reflector and an electronic flash panel, and an electric circuit representing an electronic flash circuit.

On the portion which is in the vicinity of shutter release button 18 and is in front of the front cover 3, there is provided grip section 19 which is gripped by a photographer when the photographer holds the camera in the course of photographing. At the center of the grip section 19, there is attached touch sensor 20 composed of a pair of metal plates which are extending vertically.

The touch sensor is represented by a sensor which turns on a start-charge switch when a photographer just touches the sensor, and it is not limited to those shown in the following examples, but it is preferable that the sensor is composed of two conductive members provided to be close to each other on the outer surface of the lens-fitted film unit, and turns on the start-charge switch when a finger of a photographer touches both conductive members simultaneously. Further, the sensor which does not turn on the start-charge switch when the sensor is not touched for a certain period of time or more is preferable. As a conductive member, a metal thin plate or the like is preferable. When the two conductive members are arranged to be close to each other, the distance between them is preferably within a range of 0.1 mm–10 cm. The distance which is more preferable is 1 mm–1.5 cm. An electric circuit including touch sensor 20 will be explained later.

On the right of the viewfinder window section 15, there is formed electronic flash window section 16, and light emitting section 28 is arranged inside the electronic flash window section 16 to face it. In the state shown in FIG. 1, there is arranged light-attenuating filter 27 between the electronic flash window section 16 and light emitting section 28. The light-attenuating filter 27 is connected to slide member 17 provided below the electronic flash window section 16. By moving the slide member 17 vertically, the light-attenuating filter 27 is moved freely between the insertion position shown in FIG. 1 and the retreated position to retreat from the front surface of the light emitting section while being guided by an unillustrated member.

Figure 2:
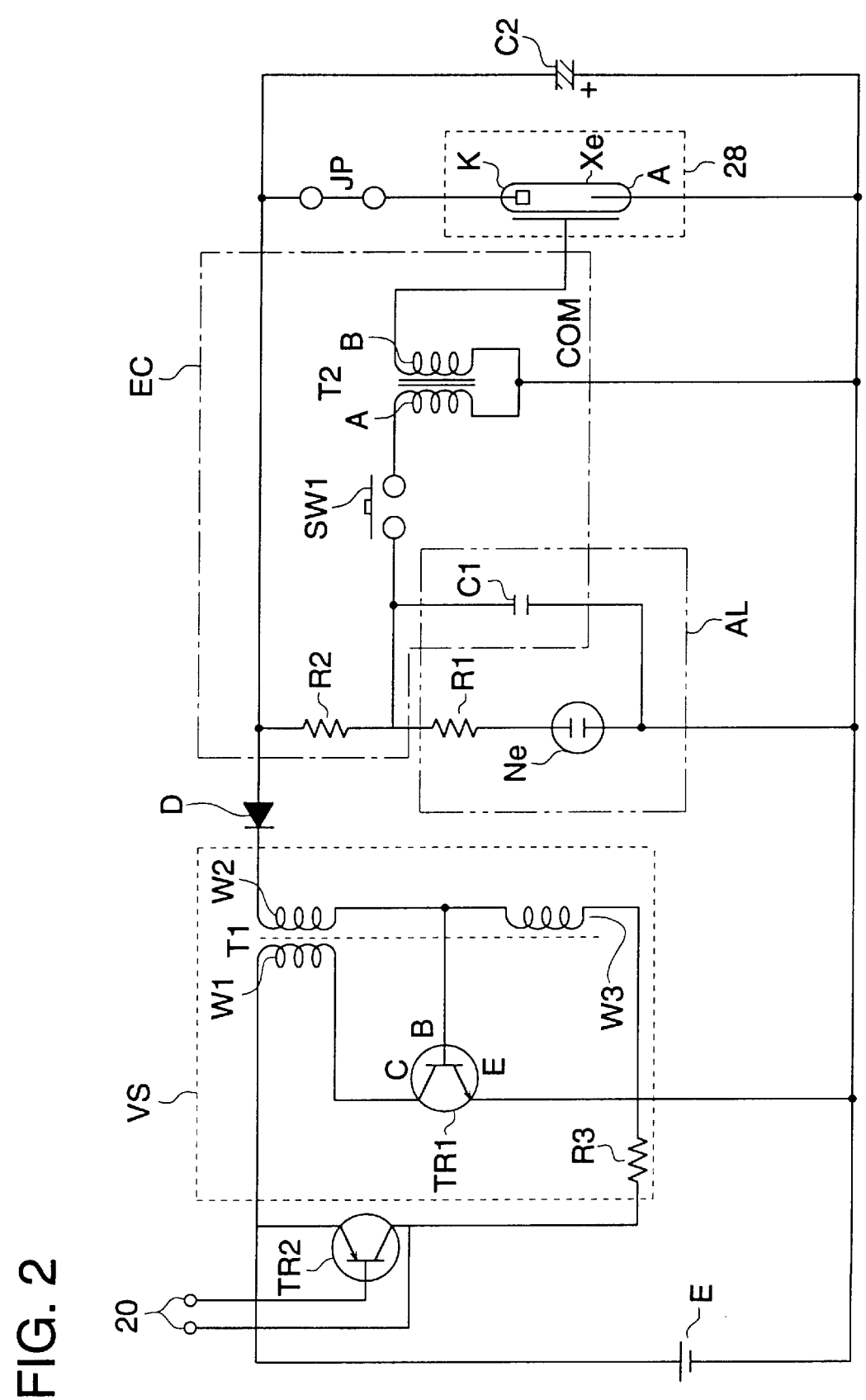
FIG. 2 is a circuit diagram of a lens-fitted film unit in the present embodiment.

FIG. 2 is a circuit diagram of a lens-fitted film unit in the present embodiment. In FIG. 2, E represents a power supply such as a battery which is connected to step-up circuit VS surrounded by dotted lines. The step-up circuit VS is composed of transistor TR1, transformer T1 having therein primary winding W1, secondary winding W2 and tertiary winding W3, and resistance R3 which are combined, and it has functions to boost the voltage by converting DC current supplied from power supply E into AC current.

The step-up circuit VS is connected to electrolytic capacitor C2 through diode D, and AC current supplied from the step-up circuit VS is rectified by diode D, and then is charged in the electrolytic capacitor C2. A negative pole and a positive pole of the electrolytic capacitor C2 are connected respectively to cathode K and anode A of electronic flash light emitting tube Xe to supply discharge current to the electronic flash light emitting tube Xe.

On the other hand, light emitting circuit EC surrounded by one-dot chain lines is connected to lattice G of the electronic flash light emitting tube Xe. This light emitting circuit EC is composed of first resistance R2, capacitor C1, synchro switch SW1 and transformer T2 having therein primary winding A and secondary winding B which are combined, and it is arranged between a negative pole and a positive pole of the electrolytic capacitor C2.

The light emitting circuit EC is arranged so that when the synchro switch SW1 is turned on responding to shutter releasing on the camera, instant current runs through the primary winding A of the transformer T2 due to electric charges accumulated in capacitor C1, then pulse-shaped voltage generated in the secondary winding B based on the instant current is given to lattice G of the electronic flash light emitting tube Xe to make it to emit light.

The light emitting circuit EC is connected to display circuit AL which is for displaying completion of charging. The display circuit AL shown with two-dot chain lines is positioned between ground and a mutual junction point of resistance R2 and synchro switch SW, and has therein a series circuit composed of second resistance R1 and neon tube Ne and of capacitor C1 connected to the series circuit in parallel.

Further, in the present embodiment, there are provided touch sensor 20 and transistor TR2, as a touch sensor circuit having functions like those of the start-charge switch which starts charging of electrolytic capacitor C2. The portion of the transistor TR2 on the part of a collector is connected to the point located between the positive pole of battery E and primary winding W1 in transformer T1 of step-up circuit VS, while, the portion of the transistor TR2 on the part of an emitter is connected to tertiary winding W3 of the step-up circuit VS through resistance R3. The portion of the transistor TR2 on the part of a base and the portion of the transistor TR2 on the part of an emitter are connected respectively to a pair of conductive plates (see FIG. 1) representing touch sensor 20.

Operations in the present embodiment will be explained. In FIG. 1, when a photographer holds grip section 19 of a lens-fitted film unit for photographing, the touch sensor 20 is closed for continuity because conductive plates of the touch sensor 20 are touched by a finger of the photographer.

In FIG. 2, the transistor TR2 is turned on by that continuity, and thereby, the step-up circuit VS connected to battery E generates high AC voltage. This high AC voltage is rectified by diode D and is charged into electrolytic capacitor C2. Incidentally, in the present embodiment, the electrolytic capacitor C2 is relatively small in terms of capacity, and the time for charging it is within 3 seconds.

When the electrolytic capacitor C2 is fully charged, capacitor C1 of the display circuit AL is also charged, and neon tube Ne flickers. Due to this, the photographer learns that charging has been completed. Then, when the photographer presses shutter release button 18 (FIG. 1), synchro switch SW1 is closed to be turned on through an unillustrated mechanism, thereby voltage is impressed on lattice G of electronic flash light emitting tube Xe, and the electronic flash light emitting tube Xe emits light so that photographing with electronic flash may be carried out.

As stated above, charging for the purpose of emission of electronic flash is started just by holding grip section 19 for photographing, independently of an intention of a photographer in the present embodiment. Therefore, the photographer is released from troublesome operations to judge the luminance of the field to be photographed and to turn on the switch for emission of electronic flash. It is also possible to prevent under exposure in photographing, because electronic flash emission is carried out regardless of luminance of the field to be photographed. It is further possible to restrain unnecessary power consumption when a camera is not used, because charging is not conducted as far as the grip section 19 is not gripped. Incidentally, the conductive plate may be either a metal plate or conductive rubber, or even a wire may be used instead. Further, the transistor TR2 and resistance R3 may also be arranged to be opposite each other.

When an arrangement is made so that an electronic flash unit emits light constantly as stated above, it is feared that over exposure is caused when luminance of the field to be photographed is high. In the present embodiment, therefore, light-attenuating filter 27 representing a control means is arranged before a light emitting section as shown in FIG. 1 to prevent over exposure in photographing by controlling an amount of emitted light in electronic flash in the case of high luminance. Incidentally, when emission of electronic flash is not desired as in the case of photographing through glass, a shutter release button can be pressed for photographing before completion of charging, after gripping a grip section.

On the contrary, when luminance of the field to be photographed is low, it is possible to prevent under exposure in photographing without restraining an amount of electronic flash emission, by pressing down slide member 17 and thereby by retreating light-attenuating filter 27 from the front of the light emitting section. Incidentally, a polar screen, for example, may also be used as a light-attenuating filter.

FIG. 3 is a top view of a lens-fitted film unit in a variation of the present embodiment. It is preferable that a touch sensor is provided on the portion which is touched by a finger of a photographer when the photographer holds a lens-fitted film unit for the ready. As an example, a touch sensor is provided on the grip section in the previous example. However, in the variation, the touch sensor is not provided on grip section 19, but touch sensor 120 composed of a pair of conductive plates is provided on the top surface of shutter release button 18, instead.

In the same way as in the embodiment stated above, touch sensor 120 is closed to be turned on and charging for the purpose of emission of electronic flash is started, just by putting a finger on shutter release button 18 for photographing. Therefore, the photographer is released from troublesome operations to judge the luminance of the field to be photographed and to turn on the switch for emission of electronic flash. Other effects in this variation are the same as those in the previous embodiment. It is also possible to provide touch sensors on plural locations on the lens-fitted film unit. For example, touch sensors may also be provided on the grip and the shutter release button.

Figure 4:
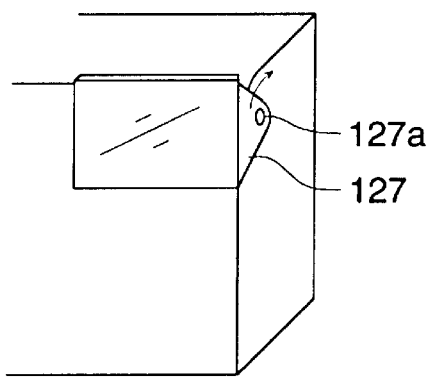
Figure 4:
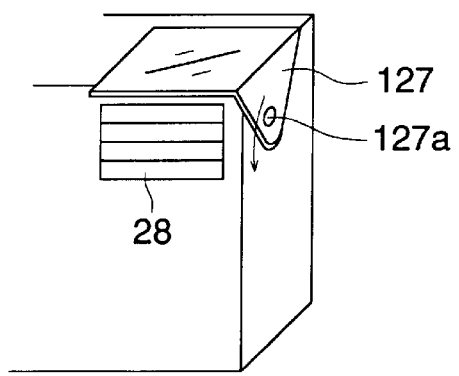

FIG. 4 is a perspective view of a lens-fitted film unit missing a part thereof in another variation. Light-attenuating filter 127 is mounted on shaft 127a rotatably around the shaft 127a which is embedded in the side of the lens-fitted film unit, and the filter is positioned in front of light emitting section 28 (FIG. 4(*b*)) in the state shown in FIG. 4(*a*).

When luminance of the field to be photographed is high or the main objct is close enough, it is possible to restrain an amount of emission of light emitting section 28 (FIG. 4(*b*)) by arranging light-attenuating filter 127 to the state shown in FIG. 4(*a*). On the other hand, when luminance of the field to be photographed is low, the filter is rotated until it shows the state shown in FIG. 4(*b*), thus, it is possible to photograph without restraining an amount of emission of the light emitting section 28, because the light-attenuating filter 127 is retreated from the front of the light emitting section 28.

FIG. 5 is a circuit diagram of a lens-fitted film unit missing a part thereof in the second embodiment. In the second embodiment, small capacity capacitor C2' is provided in parallel with electrolytic capacitor C2 so that either of them can be selected by switching switch SW2, which is different from the circuit shown in FIG. 2.

According to the second embodiment, when luminance of the field to be photographed is high or the main objct is close enough, it is possible to lessen an amount of accumulated charges (amount of charging of capacitor) accumulated in the capacitor C2' for emission by switching switch SW2 and thereby by connecting to the small capacity capacitor C2" side, and thereby to restrain an amount of emission of electronic flash light emitting tube Xe. On the other hand, when luminance of the field to be photographed is low, it is possible to photograph without restraining an amount of emission of electronic flash light emitting tube Xe by switching switch SW2 and thereby by connecting to the ordinary capacity capacitor C2 side (the state shown in FIG. 5).

FIG. 6 is a circuit diagram of a lens-fitted film unit missing a part thereof in the third embodiment. In the third embodiment, another electrolytic capacitor C2' is provided in parallel with electrolytic capacitor C2 so that the electrolytic capacitor C2' may be connected by turning on switch SW3, which is different from the circuit shown in FIG. 2.

In the third example, when luminance of the field to be photographed is high or the main objct is close enough, it is possible to limit charging for emission to electrolytic capacitor C2 only and thereby to restrain an amount of emission of electronic flash light emitting tube Xe, by turning off switch SW3 and thereby by separating electrolytic capacitor C2' from power supply E (FIG. 2). On the other hand, when luminance of the field to be photographed is low, it is possible to photograph by raising an amount of emission of electronic flash light emitting tube Xe by turning on switch SW2 and thereby by connecting electrolytic capacitor C2' to power supply E. Incidentally, an amount of emission can be adjusted by changing capacity of each of electrolytic capacitors C2 and C2'.

FIG. 7 is a circuit diagram of a lens-fitted film unit missing a part thereof in the fourth embodiment. In the fourth embodiment, resistance R4 is provided between step-up circuit VS (FIG. 2) and electrolytic capacitor C2 as well as electronic flash light emitting tube Xe, and further, resistance R5 is provided in parallel with electrolytic capacitor C2 so that both poles of the electrolytic capacitor C2 may be connected through R5 when switch SW4 is turned on, which is different from the circuit shown in FIG. 2.

In the fourth embodiment, for voltage V between both poles of electrolytic capacitor C2 under the condition that switch SW4 is turned off, voltage VL between both poles of electrolytic capacitor C2 when switch SW4 is turned on is represented by $VL=V \times R5/(R4+R5)$, wherein $V>VL$ holds because of $R5<R4+R5$.

Namely, when luminance of the field to be photographed is high or the main objct is close enough, it is possible to restrain an amount of emission of electronic flash light emitting tube Xe by turning off switch SW4, because low voltage VL is impressed on both poles of electrolytic capacitor C2 and thereby an amount of charging for emission is lowered. On the other hand, when luminance of the field to be photographed is low, when switch SW4 is turned on, high voltage V is impressed on both poles of electrolytic capacitor C2 and an amount of emission of electronic flash light emitting tube Xe is raised so that it is possible to photograph. Incidentally, an amount of emission can be adjusted by changing resistance values of resistance R4 and resistance R5.

FIG. 8 is a circuit diagram of a lens-fitted film unit missing a part thereof in the fifth embodiment. In the fifth embodiment, timer circuit TC which cuts the connection after passage of an established period of time is provided in place of a touch sensor, which is different from the circuit shown in FIG. 2. An amount of charging of electrolytic capacitor C2 (FIG. 2) is saturated after the passage of a prescribed period of time, but in the period before that prescribed period of time, it is in the tendency that it is increased with the lapse of time. It is therefore possible to change an amount of charging of electrolytic capacitor C2 by changing the charging time by the use of timer circuit TC.

Namely, when luminance of the field to be photographed is high or the main objct is close enough, it is possible to restrain an amount of emission of electronic flash light emitting tube Xe by making the set-up time of timer circuit TC to be short and by lowering an amount of charging of electrolytic capacitor C2. On the other hand, when luminance of the field to be photographed is low, it is possible to raise an amount of emission of electronic flash light emitting tube Xe to photograph by making the set-up time of timer circuit TC to be long and by raising an amount of charging of electrolytic capacitor C2. Incidentally, an amount of emission can be adjusted by changing the set-up time of timer circuit TC.

FIG. 9 is a circuit diagram of a lens-fitted film unit missing a part thereof in the sixth embodiment. In the sixth embodiment, stop boosting circuit ST is provided between a step-up circuit and a display circuit, which is mainly different from the circuit shown in FIG. 2. In the structure of the stop boosting circuit ST, switch SW5, Zener diode ZD and resistance R5 are connected in series, and in parallel with those, transistor TR3 and resistance R7 are connected.

In the state wherein switch SW5 is turned on, when electrolytic capacitor C2 reaches a certain level of voltage, Zener diode ZD is turned on, and thereby, an electric current flows from step-up circuit VS in the direction of arrow mark B. Therefore, transistor TR1 of the step-up circuit VS is turned off, and voltage-boosting operations are stopped. On the other hand, in the state wherein switch SW5 is turned off, voltage-boosting operations are continued until the electrolytic capacitor C2 is fully charged.

Namely, when luminance of the field to be photographed is high or the main objct is close enough, it is possible to restrain an amount of emission of electronic flash light emitting tube Xe by turning on switch SW5 and by lowering an amount of charging of electrolytic capacitor C2. On the other hand, when luminance of the field to be photographed is low, it is possible to raise an amount of emission of electronic flash light emitting tube Xe to photograph by turning off switch SW5 and thereby by raising an amount of charging of electrolytic capacitor C2.

Though the invention has so far been explained on reference to embodiments 1–6, the invention is not limited to the embodiments stated above, and it can naturally be modified or improved. For example, with regard to the capacitors shown in FIGS. 5 and 6, three or more of them can also be provided without being limited to only two, to control more fully an amount of emission by switching them or adding them.

Though a touch sensor is used as a switch for electronic flash in the present example, a vibration detecting means shown in the example described later may also be used as a switch for electronic flash. It is further possible to provide a photosensor so that a control means for an amount of emission of electronic flash may control an amount of emission. Further, in place of the control means for an amount of emission of electronic flash, an aperture-switching mechanism by means of a slider or a cover body may be provided.

Embodiments 7–9 of the invention will be explained in detail as follow.

Each of FIGS. 10–13 shows a lens-fitted film unit in the seventh embodiment of the invention.

Lens-fitted film unit 201 is a handy camera which is put on the market in the state wherein a photographic film is loaded in the camera in advance, and a photographic film is loaded in the camera in the course of assembling the camera, to free a user from loading and rewinding of a photographic film and thereby to make the user photograph immediately.

This lens-fitted film unit 201 is composed of front cover 202 and rear cover 203 which are incorporated, camera lens 204 is provided on the central portion on the front side of the film unit, viewfinder 205 is provided above the camera lens 204, and electronic flash light emitting window 206 is provided in the vicinity of the viewfinder 205.

Under the electronic flash light emitting window 206, there is provided electronic flash lever switch 207 representing a switching lever. This electronic flash lever switch 207 is arranged to switch the electronic flash unit between the state of use and the state of non-use.

On the right side of the lens-fitted film unit 201, there is provided grip section 208, and shutter release button 209 is provided on the top of the grip section 208.

In the inner part interposed between front cover 202 and rear cover 203 of the lens-fitted film unit 201, there is positioned main body 210 as shown in FIG. 11.

On the central portion of the main body 210, there is provided photographing frame 210a, and film-housing chamber 210b is provided on one side of the photographing frame 210a and film take-up chamber 210b is provided on the other side of the photographing frame 210a in a way that the photographing frame 210a is interposed between the film-housing chamber 210b and the film take-up chamber 210c.

On the top of the main body 210, there is provided boss 210d on which sector lever 212 which drives sector 211 is mounted rotatably. Between engagement section 212a of the sector lever 212 and engagement projection 210e of the main body 210, there is provided spring 213, and the sector lever 212 is urged constantly by the spring 213 in the direction to be closed.

The boss 212b of the selector lever 212 is engaged with U-shaped groove 211a on the sector 211 to transmit movement of the selector lever 212 to the sector 211.

It is so arranged that the sector lever 212 is rotated by release mechanism 214 incorporated in the main body 210, and the release mechanism 214 is operated by release button 209.

On the front side of the photographing frame 210a of the main body 210, there is provided spacer 215, and on the front side of the spacer 215, there is provided lens holder 216 with its claw section 216a engaging with recessed portion 215a of the spacer 215. On the spacer 215, there is formed exposure window 215b, and the sector 211 is arranged between the spacer 215 and the lens holder 216.

The sector 211 whose hole 211b being engaged with boss 215c of the spacer 215 is operated by the sector lever 212 to make the exposure window 215b to be ready to be opened.

In the lens holder 216, camera lens 204 is mounted on lens mounting section 216b, and exposure opening 216c is formed on the portion corresponding to the camera lens 204.

On the lens holder 216, there is set aperture plate 217. On the aperture plate 217, there are formed aperture hole 217a for a bright scene (aperture for brightness) and aperture hole 217b for a gloomy scene (aperture for gloom) which is greater in terms of aperture diameter than the aperture hole 217a, and the aperture plate 217 is supported rotatably by the spacer 215, with engagement hole 217d formed on the aperture plate 217 engaged with a boss provided on the spacer 215.

On the aperture plate 217, there is formed elongated hole 217c, and this elongated hole 217c is engaged with projected section 218a of slide lever 218, and stopper section 218b is formed on the slide lever 218.

Further, on the slide lever 218, there is formed projected section 218c which is engaged with two ribs 207a of electronic flash lever switch 207.

The electronic flash lever switch 207 and the slide lever 218 operate solidly in the direction of arrow mark A, thus, an aperture is switched.

Namely, the electronic flash lever switch 207 and the slide lever 218 constitute photographing condition setting means B which switches to three positions including a non-photographing position, a position for the aperture for brightness and for turning on electronic flash charging, and a position for the aperture for gloom and for turning on electronic flash charging, as shown in FIGS. 12(a)–12(c).

In describing more fully, in the case of conducting electronic flash emission by the use of an electronic flash unit, when the electronic flash lever switch 207 is operated in the direction A by one step, an unillustrated contact for charging a capacitor for electronic flash is closed to create a position to turn on electronic flash charging, the slide lever 218 also operates likewise, then, aperture plate 217 rotates from its initial position in FIG. 12(a) with elongated hole 217c of the aperture plate 217 engaged with projected section 218a as shown in FIG. 12(b), and the aperture hole 217a approaches exposure hole 216c on the lens holder 216, which results in the state of the aperture for brightnesse.

When the electronic flash lever switch 207 is operated in the direction A by another one step, the slide lever 218 also operates likewise, then, the aperture plate 217 further rotates with its elongated hole 217c engaged with projected section 218a as shown in FIG. 12(c) under the unchanged state a position to turn on electronic flash charging, and the aperture hole 217b approaches exposure hole 216c on the lens holder 216, which results in the state of the aperture for gloom in which the aperture section is greater than that in the state of the aperture for brightness.

Incidentally, when no electronic flash unit is used, the electronic flash lever switch 207 and the slide lever 218 are at their initial positions, and when the projected section 218a is engaged with the elongated hole 217c of the aperture plate 217, exposure hole 216c of the lens holder 216 is covered by the aperture plate 217 as shown in FIG. 12(a), and display plate 217e is inserted in the viewfinder to indicate the state of inability to photograph also in the viewfinder.

FIG. 13 shows film-shaped light modulating member 220 which is provided in the corner of a visual field of a photographer in the aforesaid viewfinder 205, and is, for example, square-shaped to make a photographer distinguish between the state of aperture for brightness and that of aperture for gloom to recognize visually.

The light modulating member 220 is formed with photochromic material, for example, and it changes transmission factor of light in accordance with a level of luminance of environmental light (level of a quantity of light). Namely, when the aperture set by a photographer under a high level of luminance of environmental light is to represent the state of aperture for brightness, the light modulating member 220 is changed to black (shown with crossed oblique lines) as shown on the lower step in FIG. 13.

When the aperture set by a photographer under a low level of luminance of environmental light is to represent the state of aperture for gloom, the light modulating member 220 is hardly as shown on the upper step in FIG. 13. This makes a photographer who sees through the viewfinder 205 to distinguish and recognize clearly the state to select the aperture for brightness or aperture for gloom, which makes it possible to conduct photographing which is more appropriate.

Owing to operations of the photographing condition setting means B, operations for switching an electronic flash unit and aperture plate 217 can be carried out on a interlocking basis. Namely, when a photographer photographs using the lens-fitted film unit 201, an electronic flash unit is set to be possible to emit light by the photographing condition setting means B, thus, light is emitted simultaneously with operations of shutter release button 209, 2-step aperture switching can be conducted in accordance with a level of brightness in photographing, electronic flash light is emitted constantly regardless of bright scene and gloomy scene of an object, and it is possible to obtain beautiful photographs under the appropriate state of aperture.

It is further possible for a photographer who looks through viewfinder 205 to clearly select an aperture for brightness or an aperture for gloom for photographing, by recognizing light modulating member 220. In the present example, a switch for electronic flash is interlocked with switching of apertures. However, it is also possible to make an arrangement wherein a touch sensor shown in the example stated before or a vibration detecting means which will be shown in an example stated later is provided as a switch for electronic flash, and switching of apertures only is conducted by a mechanism employing a slider like that shown in the present example.

Each of FIGS. 14–16 shows lens-fitted film unit 301A in the eighth embodiment of the invention.

This lens-fitted film unit 301A is the same in terms of basic structure as lens-fitted film unit 201 in the seventh embodiment, but it is characterized to be equipped with cover body 321 which covers viewfinder 305 and an outer surface of shutter release button 309 when the lens-fitted film unit is not used for photographing, and uncovers viewfinder 305 and shutter release button 309 with sliding operations in the arrowed direction shown in FIG. 14 which are for movement from the non-photographing position to the position of aperture for brightness and for turning on of charging for electronic flash and to the position of aperture for gloom and for turning on of charging for electronic flash.

This lens-fitted film unit 301A is equipped with preparation mechanism to start photographing 322 which conducts operations to turn on or turn off charging of an electronic flash unit and operations to switch between an aperture for brightness and an aperture for gloom in accordance with sliding operations of the cover body 321, and photographing condition setting means B is composed of the cover body 321 and the preparation mechanism to start photographing 322.

In the preparation mechanism to start photographing 322, an projected end of sliding piece 323 provided on the inner side of the bottom of the cover body 321 is connected to one end of rotating plate 325 supported rotatably on shaft section 324 which is studded on main body 310 as shown in FIG. 15, for example, and connection piece 326 is provided between the other end of the rotating plate 325 and the slide lever 318, and thereby electronic flash lever switch 307 and slide lever 318 are caused to operate in the same way as in the seventh example in accordance with sliding operations of the cover body 321, which starts charging for electronic flash and rotates aperture plate 217 (see FIG. 11) from its initial position to the state of aperture for brightness and further to the state of aperture for gloom. Incidentally, the indication of the position of the cover body 321 for an aperture for brightness and an aperture for gloom can be carried out by printing letters of an aperture for brightness and an aperture for gloom at a prescribed interval on the top surface of front cover 302, as shown in FIG. 16.

Even in the case of the lens-fitted film unit 301A in the eighth embodiment, an electronic flash unit can be set to be ready for flashing with operations of shutter release button 309, only by sliding cover body 321, and an aperture can be set to an aperture for brightness or an aperture for gloom depending upon a level of brightness in the course of photographing, which makes it possible to obtain an excellent photograph regardless of a bright scene and a gloomy scene.

It is further possible for the cover body 321 to prevent damage of viewfinder 305 and shutter release button 309 during a non-photographing period, because the cover body 321 covers at least one of the viewfinder 305 and shutter release button 309 of the lens-fitted film unit 301A during the non-photographing period. Though a switch for electronic flash is interlocked with switching of apertures even in the present example, it is also possible to make an arrangement wherein a touch sensor shown in the example stated before or a vibration detecting means which will be shown in an example stated later is provided as a switch for electronic flash, and switching of apertures only is conducted by a mechanism to slide a cover body as shown in the present example.

Each of FIGS. 17–21 shows lens-fitted film unit 401C in the ninth embodiment in the invention.

This lens-fitted film unit 401C shown in FIG. 17 is the same in terms of basic structure as lens-fitted film unit 201 in the seventh embodiment, but it is characterized in that vibration sensor 430 representing a vibration detecting means which detects generation of vibration of lens-fitted film unit 1C itself is provided on main body 210 (see FIG. 11) inside front cover 402, in place of the electronic flash lever switch 207, and photosensor 431 representing a photo-detecting means which detects luminance of environmental light for the lens-fitted film unit is provided between viewfinder 405 of the front cover 402 and electronic flash emission window 406.

Vibration sensor 430 includes those of various types in which plural conductive contact pieces 433, 434a and 434b are arranged at an interval on the outer circumferential surface of cylindrical body (or sphere) 435 supported on holder 432 as shown in FIG. 18, and conductive sphere 436 is put in the cylindrical body 435 so that conductive contact piece 433 and conductive contact piece 434a, for example, are connected electrically by displacement of the conductive sphere 436 caused by vibration, thus, generation of vibration of lens-fitted film unit 1C itself is detected, namely, movement to the state of photographing by the lens-fitted film unit 401C is detected.

Incidentally, an end of the cylindrical body 435 is naturally covered so that the conductive sphere 436 may not jump out.

Next, a control circuit for an electronic flash unit in lens-fitted film unit 401C will be explained, referring to FIG. 19.

The lens-fitted film unit 401C has therein power supply 440, vibration sensor 430, electronic flash circuit 441 which starts charging of capacitor C in an electronic flash unit based on signals of vibration detected by vibration sensor 430, charging suspension circuit 442 which stops charging of the capacitor C after the passage of a certain period of time from the start of charging, electronic flash lamp (xenon lamp) 443 which emits light based on supply of electric charges charged from the capacitor C, trigger circuit 444 including the shutter release button 409 which sends trigger signals for emission of the electronic flash lamp 443, photosensor 431 such as CdS, and emission control circuit 445 which conducts emission stop control or emission control for the electronic flash unit depending on the level of luminance of environmental light detected by photosensor 431.

FIG. 20 shows a practical example of the circuit shown in FIG. 19, wherein a timer circuit having a prescribed time constant is constituted with resistance R1 and capacitor C1, and when vibration sensor 430 is turned on momentarily by vibration, the capacitor C1 is discharged and base voltage of transistor Q1 becomes a prescribe voltage to turn on the transistor Q1. When the transistor Q1 is turned on, an oscillation circuit composed of resistance R2, transformer T and transistor Q2 oscillates, thus, DC voltage rectified by diode D is supplied to capacitor C which is then charged accordingly.

After passage of a certain period of time determined by time constant of resistance R1 and capacitor C1, base voltage of transistor Q1 is boosted again, transistor Q1 is turned off, and oscillation of transformer T and transistor Q2 is stopped, resulting in suspension of charging of capacitor C.

Thyristor 447 is controlled to be turned on or turned off depending on the level of intensity of incident light in photosensor 431 shown in FIG. 20, and light emission of electronic flash lamp 443 caused when trigger switch 444a in trigger circuit 444 is turned on as well as non-light-emission are controlled.

In the case of the lens-fitted film unit 1C with the circuit structure stated above, charging of capacitor C in the electronic flash unit is started in response to vibration caused when a photographer holds lens-fitted film unit 1C itself for photographing, and after lapse of a certain time from the start of charging, charging suspension circuit 442 stops the charging of capacitor C of electronic flash circuit 441. Therefore, the electronic flash unit can be set automatically to be ready for flashing only by holding lens-fitted film unit IC by hands for photographing.

In the course of shutter release operations by shutter release button 409, emission control circuit 445 conducts emission stop control or emission control for the electronic flash unit depending on the level of luminance of environmental light detected by the photosensor 431. Therefore, there is caused no problem that an electronic flash unit flashes when luminance of environmental light is high, or an electronic flash unit does not flash when luminance of environmental light is low, which makes it possible to always obtain an excellent photograph. Incidentally, the numeral 446 is a step-up circuit.

FIG. 21 shows another practical example of the circuit shown in FIG. 19, wherein a circuit composed of resistance RX, capacitor Cx, resistance R3 and transistor Q3 is provided additionally between the vibration sensor 430 and capacitor C1.

In the case of the circuit structure stated above, even when the vibration sensor 430 is turned on and its state is maintained, transistor Q3 is turned off after lapse of a certain period of time determined by time constant of resistance RX and capacitor Cx, and thereby, transistor Q1 is surely turned off to stop charging of capacitor C.

Incidentally, in the case of the circuit structure shown in FIG. 20, when the vibration sensor 430 is turned on and its state is maintained, the transistor Q1 is not turned off and charging of capacitor C is continued. Though the vibration detecting means is used as a switch for electronic flash in the present embodiment, a touch sensor shown in the previous example may also be used as a switch for electronic flash, in place of the vibration detecting sensor. It is also possible to arrange so that the control means for an amount of emission of electronic flash stated above may be interlocked in accordance with results of detection by a photosensor. Or, the aperture-switching means stated above or a control means for an amount of emission of electronic flash may be provided without providing a photosensor.

Since the lens-fitted film unit of the invention is equipped with a touch sensor provided on the portion which is touched by a finger of a photographer when the photographer holds the lens-fitted film unit for the ready, and the start-charge switch is turned on when a finger of the photographer touches the touch sensor, charging for an electronic flash can be started when the photographer just holds the lens-fitted film unit for the ready for releasing the shutter, and thereby the electronic flash unit flashes responding to shutter releasing even when the photographer does not intend to make the electronic flash unit to emit light, which prevents under exposure and offers easy operation.

If the photographer unhands the lens-fitted film unit, charging for an electronic flash is automatically stopped. Therefore, there will be caused no problem that a switch of the electronic flash unit fails to be turned off, and a battery is made to be dead.

Since the lens-fitted film unit of the invention is equipped with an electronic flash unit which is constantly ready to flash in response to shutter releasing regardless of a level of luminance of the field to be photographed, it is possible to prevent under exposure, and it is further possible to prevent over exposure by controlling an amount of emission when luminance of a field to be photographed is high, because of the control means provided which controls an amount of emission of the electronic flash unit at least in two steps.

In another embodiment of the invention, an electronic flash unit never fails to emit light when a photographer photographs, and aperture switching can be conducted in plural steps in accordance with a level of brightness in the course of photographing. It is therefore possible to provide a lens-fitted film unit which makes it possible to constantly obtain an excellent photograph regardless of a bright scene or a gloomy scene.

In the case of another embodiment of the invention, it is possible to make an electronic flash unit emit light surely only by sliding a cover body, and an aperture can be set either to an aperture for brightness or to an aperture for gloom depending on a level of brightness in the course of photographing. It is therefore possible to provide a lens-fitted film unit which makes it possible to constantly obtain an excellent photograph regardless of a bright scene or a gloomy scene.

In still another embodiment of the invention, it is possible to recognize an aperture whether it is an aperture for brightness or an aperture for bloom by recognizing visually a light modulating member in a viewfinder, and thereby it is possible to provide a lens-fitted film unit wherein more appropriate photographing is possible.

Another embodiment of the invention makes it possible to provide a lens-fitted film unit wherein an electronic flash unit can automatically be set to be ready for flashing only by holding the lens-fitted film unit in a hand for the ready, and the electronic flash unit surely emits light when a photographer photographs to obtain an excellent photograph.

In another embodiment of the invention, operations to stop emission or to conduct emission of an electronic flash unit are carried out in accordance with a level of luminance of. Therefore, there is caused no problem that an electronic flash unit flashes when luminance of environmental light is high, or an electronic flash unit does not flash when luminance of m that an electronic flash unit flashes when luminance of environmental light is low, which makes it possible to always obtain an excellent photograph.

Disclosed embodiment can be varied by a skilled person without departing from the spirit and scope of the invention.

What is claimed is:

1. A lens-fitted film unit comprising:
   a photographing film, pre-loaded in the lens-fitted film unit;
   a photographing lens;
   a shutter;
   an electronic flash emission portion; and
   an electronic flash circuit, connected to said electronic flash emission portion, including:
   (a) a capacitor for storing electric charges necessary for electronic flash emission; and
   (b) a touch sensor adapted to cause said capacitor to start charging by holding said lens fitted film unit to prepare for photographing;
   wherein said touch sensor uses a portion of a human body as a conductive element.

2. The lens-fitted film unit of claim 1, further comprising a photosensor;
   wherein said electronic flash circuit conducts stop control or emission control of said electronic flash emission portion according to the luminance level detected by said photosensor.

3. The lens-fitted film unit of claim 1, wherein said start-charge switch is turned on when a photographer touches said touch sensor.

4. The lens-fitted film unit of claim 1, wherein said touch sensor includes two conductive members, provided to be close to each other, on outer surface of the lens-fitted film unit.

5. The lens-fitted film unit of claim 1, wherein said electronic flash emission portion emits light only when said capacitor is charged longer than a predetermined period of time.

6. The lens-fitted film unit of claim 1, comprising a shutter release button wherein said touch sensor is provided on said shutter release button.

7. The lens-fitted film unit of claim 1, comprising a grip portion wherein said touch sensor is provided on said grip portion.

8. The lens-fitted film unit of claim 1, comprising an emission amount control for controlling emission amount of said electronic flash emission portion so that said emission amount is selected from at least two different levels.

9. The lens-fitted film unit of claim 8, wherein said emission amount control includes:

a) an emission amount limitation member; and b) a switch member for placing said emission amount limitation member in front of said electronic flash emission portion and for withdrawing said emission amount limitation member from the front of said electronic flash emission portion.

10. The lens-fitted film unit of claim 8, wherein said emission amount control means includes a setting member for setting a charge voltage to be applied to said capacitor so that said charge voltage is selected from at least two different levels.

11. The lens-fitted film unit of claim 8, wherein said emission amount control means includes a setting member for setting a charging period of time to apply charge voltage to said capacitor so that said charging period of time is selected from at least two different levels.

12. The lens-fitted film unit of claim 8, wherein said emission amount control means includes:

a) a detection means for detecting that a charged voltage in said capacitor is at a predetermined value; and b) a stop means for stopping charge of voltage to said capacitor when said detection means detects that a charged voltage in said capacitor is at a predetermined value.

13. The lens-fitted film unit of claim 8 wherein said emission control comprises a plurality of capacitors having different capacities and a switch member adapted to select at least one of said capacitors, whereby said emission amount is varied.

14. A lens-fitted film unit comprising:

a photographing film, pre-loaded in the lens-fitted film unit;

a photographing lens;

a shutter;

an electronic flash emission portion; and an electronic flash circuit, connected to said electronic flash emission portion, including:

(a) a capacitor for storing electric charges necessary for electronic flash emission; and (b) a vibration sensor for causing said capacitor to start charging by vibration of said lens fitted film unit.

15. The lens-fitted film unit of claim 14 comprising:

a timer for stopping the charging of said capacitor after said vibration sensor causes said capacitor to start charging and said charging is continued for a predetermined period of time thereafter.

16. The lens-fitted film unit of claim 14 further comprising a photosensor;

wherein said electronic flash circuit conducts stop control or emission control of said electronic flash emission portion according to the luminance level detected by said photosensor.

17. The lens-fitted film unit of claim 14 wherein said electronic flash emission portion emits light only when said capacitor is charged longer than a predetermined period of time.

18. The lens-fitted film unit of claim 14 comprising a shutter release button wherein said touch sensor is provided on said shutter release button.

19. The lens-fitted film unit of claim 14 comprising a grip portion wherein said touch sensor is provided on said grip portion.

20. The lens-fitted film unit of claim 14 comprising an emission amount control for controlling emission amount of said electronic flash emission portion so that said emission amount is selected from at least two different levels.

21. The lens-fitted film unit of claim 20 wherein said emission amount control includes:

a) an emission amount limitation member; and b) a switch member for placing said emission amount limitation member in front of said electronic flash emission portion and for withdrawing said emission amount limitation member from the front of said electronic flash emission portion.

22. The lens-fitted film unit of claim 20 wherein said emission control comprises a plurality of capacitors having different capacities and a switch member adapted to select at least one of said capacitors, whereby said emission amount is varied.

23. The lens-fitted film unit of claim 20 wherein said emission amount control means includes a setting member for setting a charge voltage to be applied to said capacitor so that said charge voltage is selected from at least two different levels.

24. The lens-fitted film unit of claim 20 wherein said emission amount control means includes a setting member for setting a charging period of time to apply charge voltage to said capacitor so that said charging period of time is selected from at least two different levels.

25. The lens-fitted film unit of claim 20 wherein said emission amount control means includes:

a) a detection means for detecting that a charged voltage in said capacitor is at a predetermined value; and b) a stop means for stopping charge of voltage to said capacitor when said detection means detects that a charged voltage in said capacitor is at a predetermined value.

* * * * *